US012795015B2

(12) United States Patent
Sweeney et al.

(10) Patent No.: US 12,795,015 B2
(45) **Date of Patent: *Nov. 10, 2026**

(54) REMOTE CONTROL FEATURE AND SYSTEM AND METHOD FOR USE OF SAME

(71) Applicant: Enseo, LLC, Plano, TX (US)

(72) Inventors: Kevin J. Sweeney, Santa Rosa, CA (US); Vanessa Ogle, Fairview, TX (US)

(73) Assignee: Enseo, LLC, Plano, TX (US)

( * ) Notice: Subject to any disclaimer, the term of this patent is extended or adjusted under 35 U.S.C. 154(b) by 247 days.

This patent is subject to a terminal disclaimer.

(21) Appl. No.: 18/800,859

(22) Filed: Aug. 12, 2024

(65) Prior Publication Data

US 2024/0406303 A1 Dec. 5, 2024

Related U.S. Application Data

(63) Continuation of application No. 17/561,161, filed on Dec. 23, 2021, now Pat. No. 12,069,198.

(60) Provisional application No. 63/167,205, filed on Mar. 29, 2021.

(51) Int. Cl.

| | |
|---|---|
| ***H04M 1/72412*** | (2021.01) |
| ***H04M 1/72406*** | (2021.01) |
| ***H04M 1/72436*** | (2021.01) |
| ***H04W 4/14*** | (2009.01) |

(52) U.S. Cl.

CPC ... *H04M 1/72412* (2021.01); *H04M 1/72406* (2021.01); *H04M 1/72436* (2021.01); *H04W 4/14* (2013.01)

(58) Field of Classification Search

CPC ......... H04M 1/72412; H04M 1/72406; H04M 1/72436; H04M 1/72415; H04W 4/14; G08C 2201/20; G08C 2201/93; G08C 17/02

See application file for complete search history.

(56) References Cited

U.S. PATENT DOCUMENTS

| | | | |
|---|---|---|---|
| 7,366,512 | B1 | 4/2008 | Kefalas et al. |
| 8,655,345 | B2 | 2/2014 | Gold |
| 8,671,009 | B1 | 3/2014 | Coley et al. |
| 9,942,304 | B2 | 4/2018 | Gold |
| 11,144,895 | B2 | 10/2021 | Brunner |
| 2005/0114185 | A1 | 5/2005 | Rodriguez et al. |
| 2005/0222820 | A1 | 10/2005 | Chung |
| 2006/0068787 | A1 | 3/2006 | Deshpande et al. |

(Continued)

*Primary Examiner* — Farid Seyedvosoghi

(74) *Attorney, Agent, or Firm* — Scott Griggs; Griggs Bergen LLP

(57) ABSTRACT

A remote control feature and system and method for use of the same are disclosed. In one embodiment, a programming interface is configured to communicate with a smart device, which is paired with at least one proximate amenity to enable remote control thereof. A user interface of the smart device is populated with a request for a telephone number that belongs to another smart device. Upon receiving the telephone number of the other smart device, the initial smart device sends a link to the telephone number via a text messaging infrastructure, such as a short message service (SMS)-enabled infrastructure. The link includes an activation, which is authorized, that establishes a pairing between the other smart device and the at least one proximate amenity, the pairing being authorized by way of the link.

20 Claims, 6 Drawing Sheets

(56) References Cited

U.S. PATENT DOCUMENTS

| | | | |
|---|---|---|---|
| 2006/0116918 | A1 | 6/2006 | Flora et al. |
| 2008/0313005 | A1 | 12/2008 | Nessland et al. |
| 2010/0312897 | A1 | 12/2010 | Allen |
| 2013/0041790 | A1 * | 2/2013 | Murugesan ........... A63F 13/352 709/217 |
| 2016/0155324 | A1 | 6/2016 | Gabai |
| 2016/0180712 | A1 | 6/2016 | Rosen et al. |
| 2016/0198001 | A1 * | 7/2016 | Um ....................... H04L 67/125 709/205 |
| 2016/0219324 | A1 | 7/2016 | Wang |
| 2019/0172111 | A1 | 6/2019 | Schoeffler |
| 2019/0297134 | A1 * | 9/2019 | Gold ................. H04M 1/72415 |
| 2020/0327462 | A1 | 10/2020 | Marianko et al. |

* cited by examiner

REMOTE CONTROL FEATURE AND SYSTEM AND METHOD FOR USE OF SAME

PRIORITY STATEMENT & CROSS-REFERENCE TO RELATED APPLICATIONS

This application is a continuation of U.S. patent application Ser. No. 17/561,161 entitled "Remote Control Feature and System and Method for Use of Same" filed on Dec. 23, 2021; which claims priority from U.S. Provisional Patent Application No. 63/167,205 entitled "Remote Control Feature and System and Method for Use of Same" filed on Mar. 29, 2021 in the name of William C. Fang; all of which are hereby incorporated by reference, in entirety, for all purposes.

TECHNICAL FIELD OF THE INVENTION

This invention relates, in general, to remote control of televisions and the like and, in particular, to remote control features with enhanced behavior and systems and methods for use of the same that address and augment wireless operation within a room.

BACKGROUND OF THE INVENTION

Without limiting the scope of the present invention, the background will be described in relation to televisions in the hospitality lodging industry, as an example. To many individuals, a television is more than just a display screen, rather it is a doorway to the world, both real and imaginary, and a way to experience new possibilities and discoveries. Consumers are demanding enhanced convenience in an easy-to-use platform. As a result of such consumer preferences, the quality of convenience and ease-of-use are frequent differentiators in determining the experience of guests staying in hospitality lodging establishments. Accordingly, there is a need for improved systems and methods for providing enhanced content in an easy-to-use platform in the hospitality lodging industry.

SUMMARY OF THE INVENTION

It would be advantageous to achieve a remote control feature that would improve upon existing limitations in functionality. It would also be desirable to enable a computer-based electronics and software solution that would provide enhanced content in an easy-to-use platform in the hospitality lodging industry or in another environment. To better address one or more of these concerns, a remote control feature and system and method for use of the same are disclosed. In one embodiment, a programming interface is configured to communicate with a smart device, which is paired with at least one proximate amenity to enable remote control thereof. A user interface of the smart device is populated with a request for a telephone number that belongs to another smart device. Upon receiving the telephone number of the other smart device, the initial smart device sends a link to the telephone number via a text messaging infrastructure, such as a short message service (SMS)-enabled infrastructure. The link includes an activation, which is authorized, that establishes a pairing between the other smart device and the at least one proximate amenity, the second pairing being authorized by way of the link. By way of example and not by way of limitation, in one exemplary use case, the smart device is associated with a guest staying in a room in a hospitality environment and the room has the at least one proximate amenity. The system enables the link, including the activation, to establish the pairing between the smart device and the at least one proximate amenity for a duration of a stay of the guest in the hospitality environment. These and other aspects of the invention will be apparent from and elucidated with reference to the embodiments described hereinafter.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which.

DETAILED DESCRIPTION OF THE INVENTION

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific ways to make and use the invention, and do not delimit the scope of the present invention.

Figure 1A:
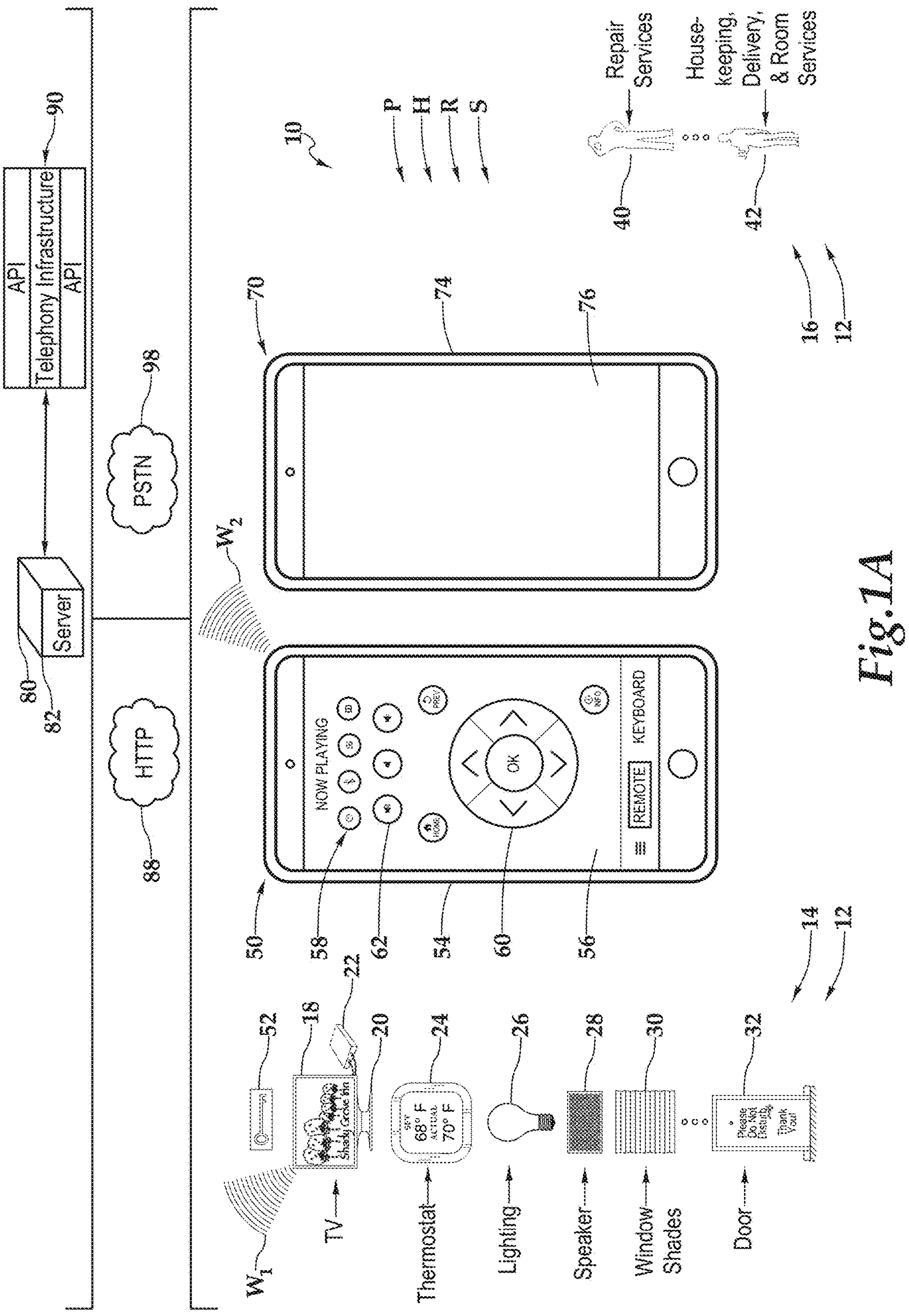
FIG. 1A is a schematic diagram depicting some embodiments of a system for providing a remote control feature in a first exemplary operational implementation, according to the teachings presented herein.

Referring initially to FIG. 1A, therein is depicted one embodiment of a system 10 for remote control on a property P. The property P may include hospitality environments, educational campuses, hospital campuses, office buildings, multi-unit dwellings, sports facilities, and shopping malls, whether a single story, multiple stories, or a combination thereof, for example. As shown, by way of example and not by way of limitation, the property P is depicted as a hospitality establishment H and particularly a hotel having various rooms, including a space S, which may be a room R. Various amenities 12 are communicatively disposed in the room. By way of example and not by way of limitation, the various amenities 12 may include environmental amenities 14 and service amenities 16. The environmental amenities 14 may include an entertainment center 18, such as, a television 20 and a set-top box 22, a thermostat 24, lighting 26, a speaker 28, window shades 30, and a door 32, which is depicted as a door indication for "Please Do Not Disturb," for example. The environmental amenities 14 may be deployed throughout the rooms R and the spaces S of the hospitality establishment H and, more generally, the environmental amenities 14 may be deployed throughout the property P. The service amenities 16, which may include repair services 40, delivery services, housekeeping services, or room service 42, for example, may similarly be available throughout the rooms R and the spaces S of the hospitality establishment H and, more generally, the service amenities 16 are available throughout the property P.

A smart device 50 is configured to communicate with the amenities 12. In one embodiment, a configuration profile 52 provides the information and credentials necessary for a smart device, such as the smart device 50, to have convenient connections to the various amenities 12. The smart device 50 may communicate wirelessly with the amenities 12. Also, wiring may provide a connection from an amenity to the television 20 or the set-top box 22, which may assist in forming the connection between the smart device 50 and the amenities 12. Also, multiple antennas may provide for the wireless capabilities of the amenities 12 and include, for example, a wireless communication $W_1$, which may utilize a wireless standard, such as Wi-Fi, Bluetooth, and ZigBee. More generally, it should be appreciated that the cabling connected to any particular amenity and the antenna configuration will depend on the environment and application and the cabling connections and wireless standards presented in FIG. 1A through FIG. 1C are depicted for illustrative purposes.

As depicted in FIG. 1A, the smart device 50 includes a housing 54 which has a user interface 56 secured thereto. Virtual buttons 58, such as virtual direction pad 60 and volume controls 62, provide remote control functionality to the smart device 50. The smart device 50 is paired with the amenities 12 as shown by wireless communication $W_2$. As also shown, the smart device 50 is controlling the television 20 via the set-top box 22 by adjusting the channel. As also depicted in FIG. 1A, a smart device 70, which includes a housing 74 and a user interface 76, is configurable to communicate with the amenities 12. A server 80, which has a housing 82, is communicatively disposed with the smart device 50 and the smart device 70. As previously alluded, it should be appreciated that the smart device 50 may control the amenities 12 directly and wirelessly, or indirectly and wirelessly, for example. By way of further example, the smart device 50 may be in direct wireless communication with the television 20 and the set-top box 22. The smart device 50 may be in indirect wireless communication with the lighting 26 by sending a command wirelessly to the set-top box 22, for example, and the set-top box 22 relaying the command to the lighting 26 by a wired or wireless connection. By way of still further example, the smart device 50 may be in indirect wireless communication with the service amenities 16 by communicating with the server 80, which relays the request to the appropriate service amenity 16. It should be appreciated that the wireless-based communication infrastructure between the smart device 50 and an amenity 12 may vary depending on the available infrastructure architecture and other communication constraints.

Figure 1B:
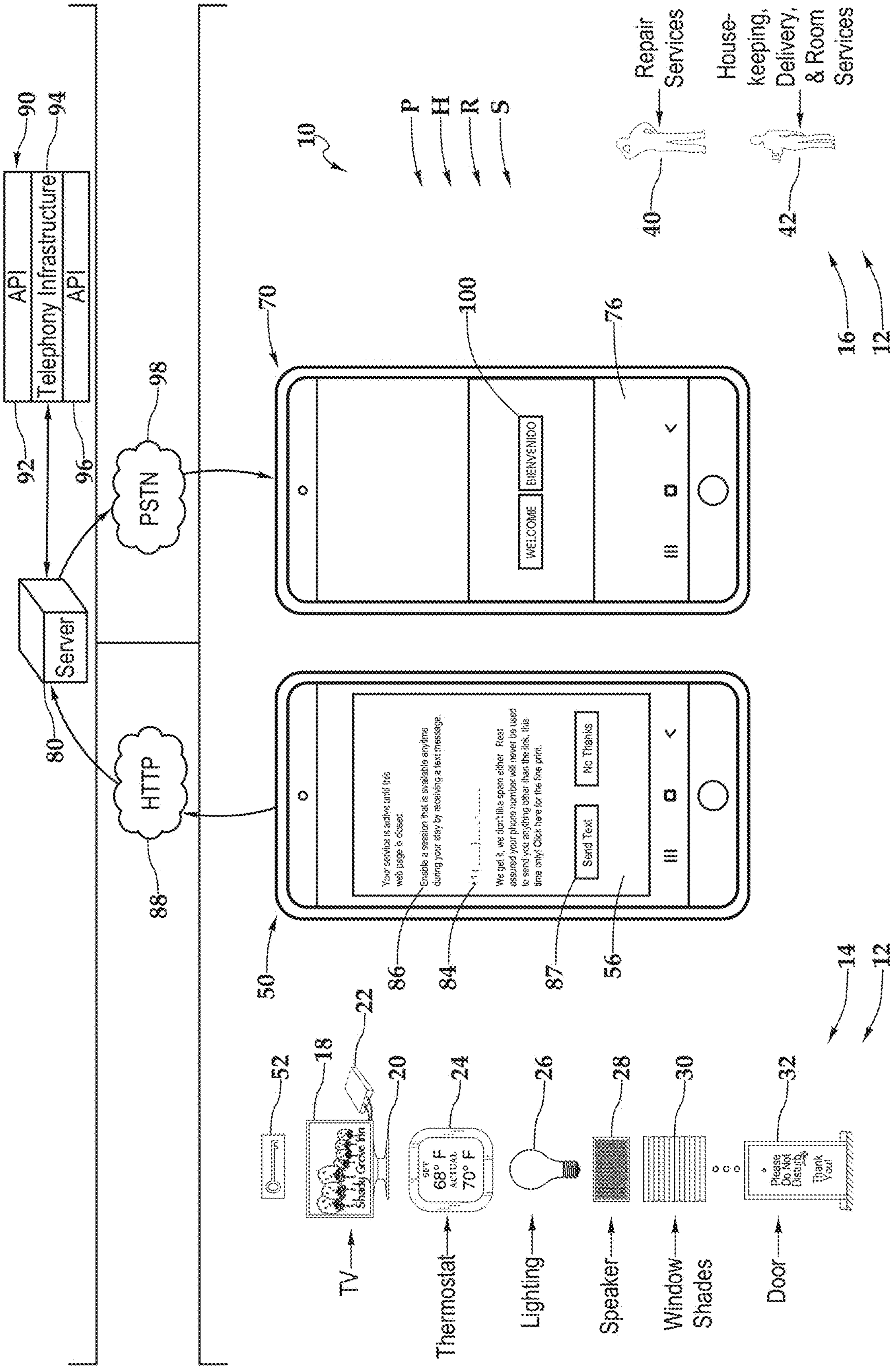
FIG. 1B is also a schematic diagram depicting the system for providing the remote control feature presented in FIG. 1A, in a second exemplary operational implementation.

Referring now to FIG. 1B, in one embodiment, a user, which may be a guest of the room R in the hospitality establishment H, of the smart device 50 desires to provide a user of the smart device 70 with remote control functionality of certain amenities, which may be the amenities 12 associated with the guest's stay in the room R. As shown, the user interface 56 of the smart device 50 is populated with a request for a telephone number 84 and instructions 86. The user of the smart device 50 enters the telephone number belonging to the smart device 70. Alternatively, the telephone number may be populated from the contact directory within smart device 50. The user of the smart device 50 then presses the "Send Text" button 87 and sends the text via the server 80 to the smart device 70. More particularly, in one implementation, the message is sent from the smart device 50 to the server 80 via a network 88, which may be an HTTP-compatible network, such as the Internet. The server utilizes a protocol stack 90, including an Internet-based application program interface (API) 92, a telephony infrastructure 94, and a circuit-switch-network-based application program interface (API) 96 to send the received message via a circuit-switched network 98, such as the Public Switched Telephone Network (PSTN), to the smart device 70. The message is received by the smart device 70 as shown by indication 100 on the user interface 76 of the smart device 70.

Figure 1C:
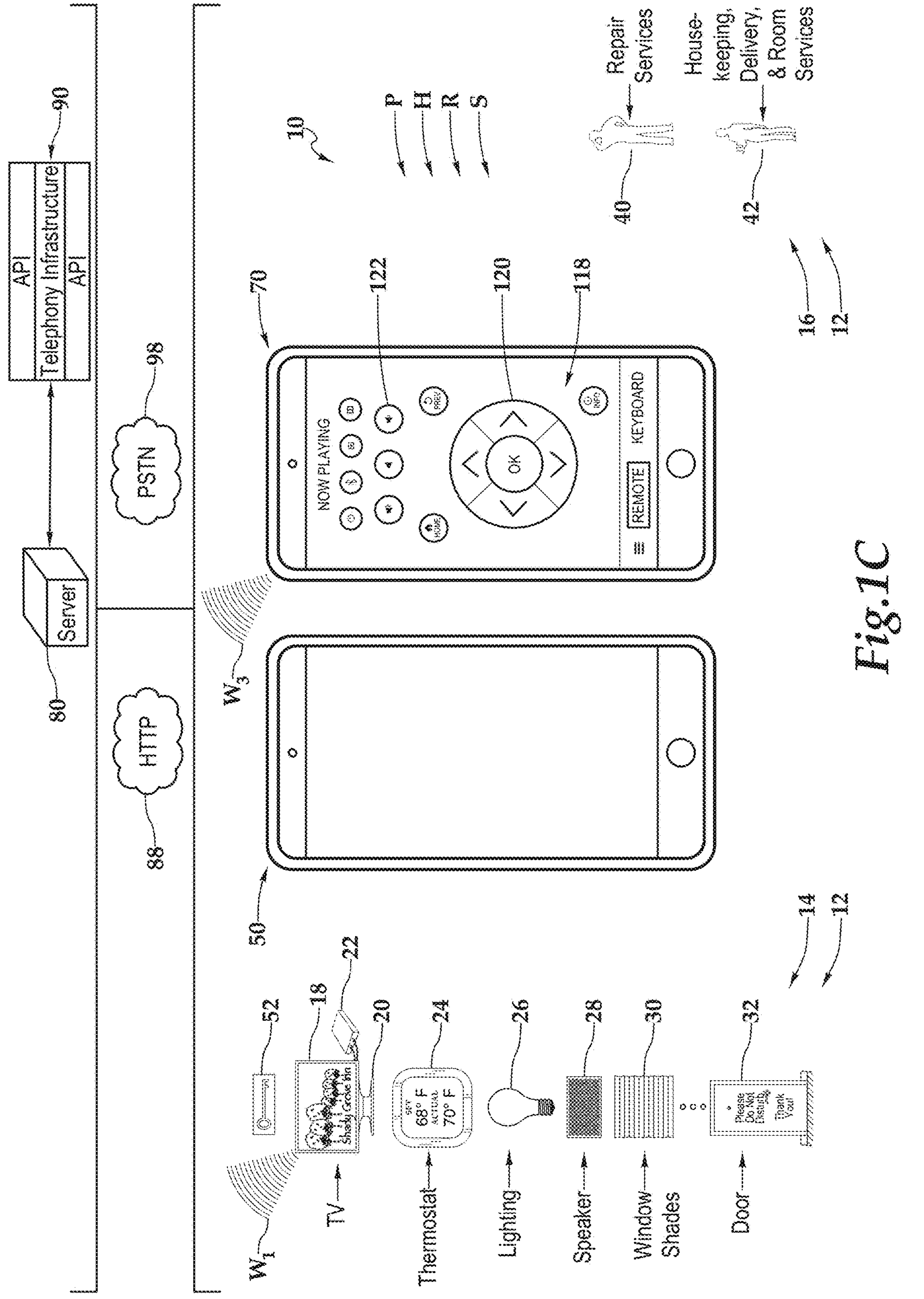
FIG. 1C is also a schematic diagram depicting the system for providing the remote control feature presented in FIG. 1A, in a third exemplary operational implementation.

Referring now to FIG. 1C, the smart device 70 is authorized to control the amenities 12 wirelessly by wireless communication $W_3$. Virtual buttons 118, such as virtual direction pad 120 and volume controls 122, provide remote control functionality to the smart device 70. The smart device 70 is paired with the amenities 12 and, as shown, the smart device 70 is controlling the television 20 via the set-top box 22 by adjusting the channel.

Figure 2:
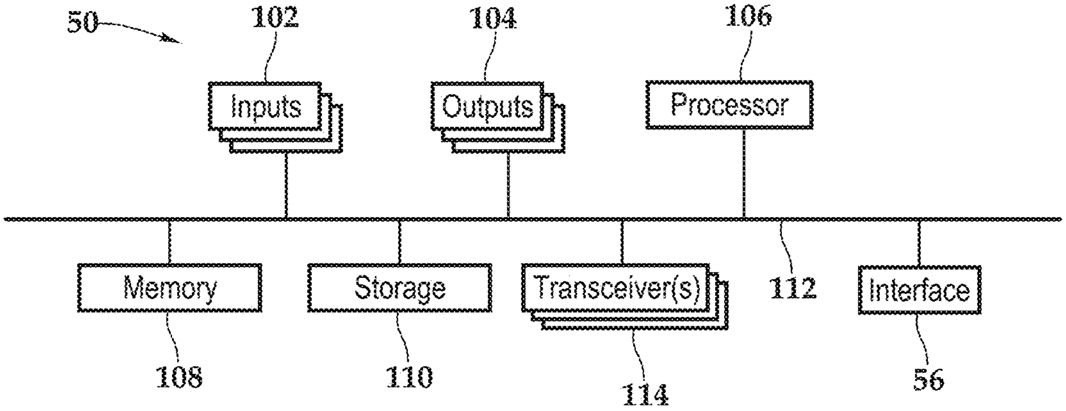
FIG. 2 is a functional block diagram depicting one embodiment of a smart device presented in FIG. 1A through FIG. 1C.

Referring now to FIG. 2, one embodiment of the smart device 50 as a computing device, includes, within the housing 54, inputs 102, outputs 104, a processor 106, memory 108, storage 110, and the user interface 56 are interconnected by a bus architecture 112 within a mounting architecture. It should be appreciated that the processor 106 may process instructions for execution within the computing device, including instructions stored in the memory 108 or in the storage 110. The memory 108 stores information within the computing device. In one implementation, the memory 108 is a volatile memory unit or units. In another implementation, the memory 108 is a non-volatile memory unit or units. The storage 110 provides capacity that is capable of providing mass storage for the smart device and store, for example, the configuration profile (see configuration profile 52 of FIG. 1A). The various inputs 102 and outputs 104 provide connections to and from the computing device, wherein the inputs 102 are the signals or data received by the smart device 50, and the outputs 104 are the signals or data sent from the smart device 50.

A transceiver or transceivers 114 are associated with the smart device 50 and communicatively disposed with the bus architecture 112. Communication between the various amenities 12 in the room R and the smart device 50 may be enabled by a variety of wireless methodologies employed by the transceiver 114, including 802.11, 3G, 4G, Edge, WiFi, ZigBee, near field communications (NFC), Bluetooth low energy, and Bluetooth, for example. Also, infrared (IR) may be utilized. As previously discussed, the transceiver 114 may be configured to be joined in network communication with at least one of the various amenities 12.

In one embodiment, the storage 110 stores the configuration profile 52, if required. The memory 108 and the storage 110 are accessible to the processor 106 and include first processor-executable instructions that, when executed, cause the processor 106 to execute a series of operations. The first processor-executable instructions cause the processor 106 to establish a pairing between the smart device 50 and the at least one of the various amenities 12. This pairing enables remote control of at least one proximate amenity by the first smart device 50. The first processor-executable instructions may then cause the processor to populate the user interface 56 with a request for the telephone number 84 that is accompanied by the user instructions 86. The processor 106 is then caused to receive the telephone number 84, which, in one exemplary embodiment, belongs to the smart device 70, but, alternatively, may belong to the smart device 50. It should be appreciated that the first processor-executable instructions may populate the user interface 56 with the request for the telephone number via a contact directory on the smart device 50 or to receive the telephone number 84 from the contact directory on the smart device 50. Alternatively, the first processor-executable instructions may receive the telephone number 84 via a virtual keypad on the user interface 56.

Continuing with the exemplary assumption that the telephone number belongs to the smart device 70, the first processor-executable instructions then cause the processor 106 to send a link to the telephone number 84 via text messaging infrastructure. These processor-executable instructions may include processor-executable instructions that, when executed by the processor 106, send the link to the telephone number 84 via a short message service (SMS)-enabled infrastructure. As previously discussed, the link includes an activation that establishes a pairing between the smart device 70 and the at least one of the various amenities 12. This pairing is authorized by way of the link. Further, the pairing enables remote control of the at least one of the various amenities 12 by the smart device 70. In one implementation, the link including the activation establishes the pairing between the smart device 70 and the at least one of the various amenities 12 for a duration of a stay of the guest in the hospitality environment H.

As mentioned, the memory 108 and the storage 110 are accessible to the processor 106 and further may include second processor-executable instructions that, when executed, cause the processor 106 to execute a series of operations. The second processor-executable instructions, when executed by the processor 106, may cause the system 10 to establish a pairing between the smart device 50 and the amenities 12 by way of the text messaging infrastructure. On the other hand, third processor-executable instructions, when executed by the processor 106, may cause the system 10 to establish a pairing between the smart device 50 and the amenities by way of a matrix barcode, such as a QR code, displayed on the television 20. In this manner, the third processor-executable instructions, when executed by the processor 106, cause the system 10 to establish a pairing between the smart device 50 and the amenities 12 with non-text messaging infrastructure.

Figure 3:
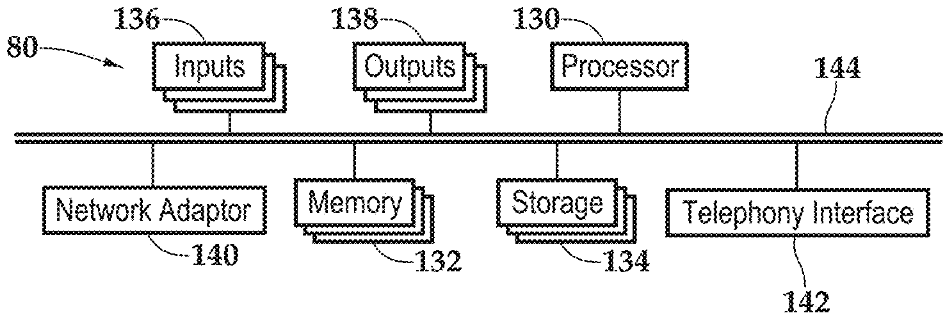
FIG. 3 is a functional block diagram depicting one operational embodiment of a server presented in FIG. 1A through FIG. 1C.

Referring now to FIG. 3, one embodiment of the server 80 as a computing device includes a processor 130, memory 132, storage 134, inputs 136, outputs 138, a network adaptor 140, and a telephony interface 142 interconnected with various buses 144 in a common or distributed, for example, mounting architecture. In other implementations, in the computing device, multiple processors and/or multiple buses may be used, as appropriate, along with multiple memories and types of memory. Further still, in other implementations, multiple computing devices may be provided and operations distributed therebetween. The processor 130 may process instructions for execution within the server 80, including instructions stored in the memory 132 or in the storage 134. The memory 132 stores information within the computing device. In one implementation, the memory 132 is a volatile memory unit or units. In another implementation, the memory 132 is a non-volatile memory unit or units. The storage 134 includes capacity that is capable of providing mass storage for the server 80. The various inputs 136 and outputs 138 provide connections to and from the server 80, wherein the inputs 136 are the signals or data received by the server 80, and the outputs 138 are the signals or data sent from the server 80. The network adaptor 140 couples the server 80 to a network (e.g., the network 88) such that the server 80 may be part of a network of computers, a local area network (LAN), a wide area network (WAN), an intranet, a network of networks, the Internet, for example. The telephony interface 142 couples the server 80 to a network (e.g., the circuit switched network 98) such that the server 80 may be part of a telephony-based or circuit-switched-based network, such as a Plain Old Telephone System (POTS) or a Public Switched Telephone Network (PSTN).

The memory 132 and storage 134 are accessible to the processor 130 and include processor-executable instructions that, when executed, cause the processor 130 to execute a series of operations. In one embodiment, the processor-executable instructions cause the processor 130 to receive operational data from one of the smart devices. The processor-executable instructions may then cause the processor 130 to store the operational data from the smart device in a database, which may be associated with the storage 134. The processor-executable instructions may cause the processor 130 to maintain a database in the storage 134, for example, of the configuration profiles for the operation of various amenities. The processor-executable instructions may also cause the processor 130 to send configuration profiles to smart devices or access configuration profiles.

In some embodiments, the processor-executable instructions cause the processor 130 to receive a message from a smart device via the network adaptor 140. The message includes a link addressed to a telephone number. The processor-executable instructions may then be caused to use a text messaging infrastructure to send the message including the link to the telephone number. The text messaging infrastructure may include a short message service (SMS)-enabled infrastructure having, for example, an HTTP application program interface, and a PSTN application program interface. As previously discussed, the link includes an activation that establishes an authorized pairing between a smart device and the amenities.

Figure 4:
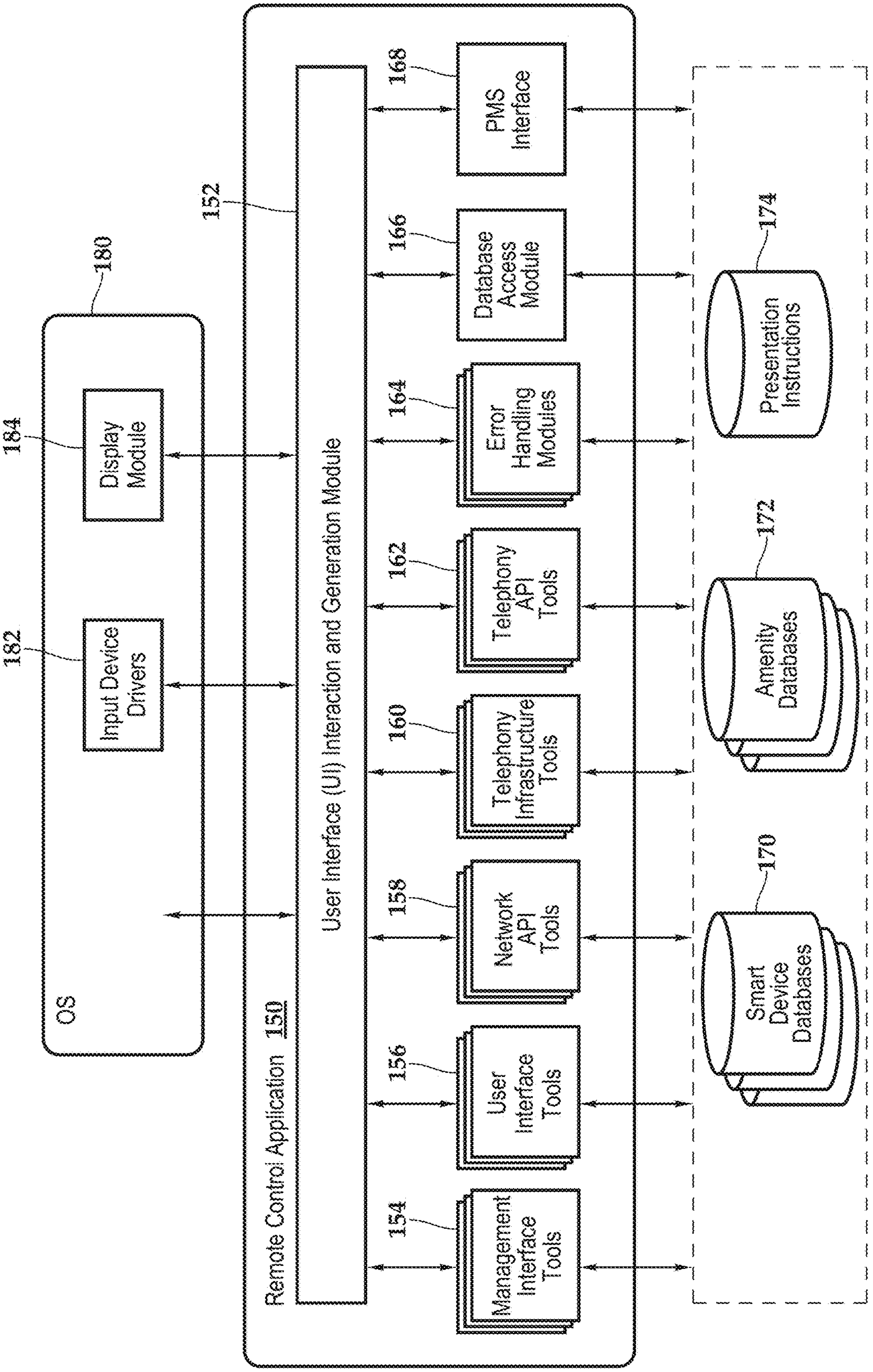
FIG. 4 is a conceptual module diagram depicting a software architecture of a remote control application of some embodiments.

FIG. 4 conceptually illustrates the software architecture of a remote control application 150 of some embodiments that may provide for remote control of amenities within the hospitality establishment H or more generally the property P. In some embodiments, the remote control application 150 includes a programing interface or is a stand-alone application or is integrated into another application, while in other embodiments the application might be implemented within an operating system 180. In some embodiments, the remote control application 150 is located on a single device, while in other embodiments the remote control application 150 is located on multiple devices. Furthermore, in some embodiments, the remote control application 150 is provided as part of a server-based solution or a cloud-based solution. In some such embodiments, the application is provided via a thin client. That is, the application runs on a server while a user interacts with the application via a separate machine remote from the server. In other such embodiments, the application is provided via a thick client. That is, the application is distributed from the server to the client machine and runs on the client machine.

The remote control application 150 includes a user interface (UI) interaction and generation module 152, management interface tools 154, user interface tools 156, network API tools 158, telephony infrastructure tools 160, telephony API tools 162, error handling modules 164, a database access module 166, and a property management system (PMS) interface 168. The remote control application 150 has access to smart device databases 170, amenity databases 172, and presentation instructions 174, which presents instructions for the operation of the remote control application 150. In some embodiments, storages 170, 172, and 174 are all stored in one physical storage. In other embodiments, the storages 170, 172, 174 are in separate physical storages, or one of the storages is in one physical storage while the other is in a different physical storage.

The UI interaction and generation module 152 generates a management interface via the management interface tools 154 that allows a manager to specify parameters that may be utilized to determine remote control functionality. By way of example, the management interface tools 154 may establish that the duration of an activation of a smart device controlling one or more amenities as being for the duration of a stay of a guest in a hospitality environment. The UI interaction and generation module 152 also generates a user interface via the user interface tools 154 that allows the user to authorize a smart device to have remote control functionality of various amenities. The network API tools 158, the telephony infrastructure tools 160, and the telephony API tools 162 assist with processing messages received from one smart device to another smart device to enable remote control functionality. Error handling is performed by the error handling modules 164. Error handling may relate to re-sending a text, telephone numbers that cannot receive text messages, telephone numbers that have opted-out, and various room verification issues, for example. The database access module 166 handles requests for accessing data, including reading and writing, in the smart device databases 170 and the amenity databases 172, which provide an organized collection of data relative to the smart devices and amenities utilizing the system presented herein. The property management system interface 168 provides communication with the software that enables a hotel or group of hotels, for example, to manage front-office and other capabilities, such as booking reservations, guest check-in/check-out, room assignment, managing room rates, and billing, for example.

In the illustrated embodiment, FIG. 4 also includes the operating system 180 that includes input device drivers 182 and a display module 184. In some embodiments, as illustrated, the input device drivers 182 and display module 184 are part of the operating system 180 even when the remote control application 150 is an application separate from the operating system 180. The input device drivers 182 may include drivers for translating signals from a keyboard, mouse, touchpad, tablet, touch screen, gyroscope, or accelerometer, for example. A user interacts with one or more of these input devices, which send signals to their corresponding device driver. The device driver then translates the signals into user input data that is provided to the UI interaction and generation module 152.

Figure 5:
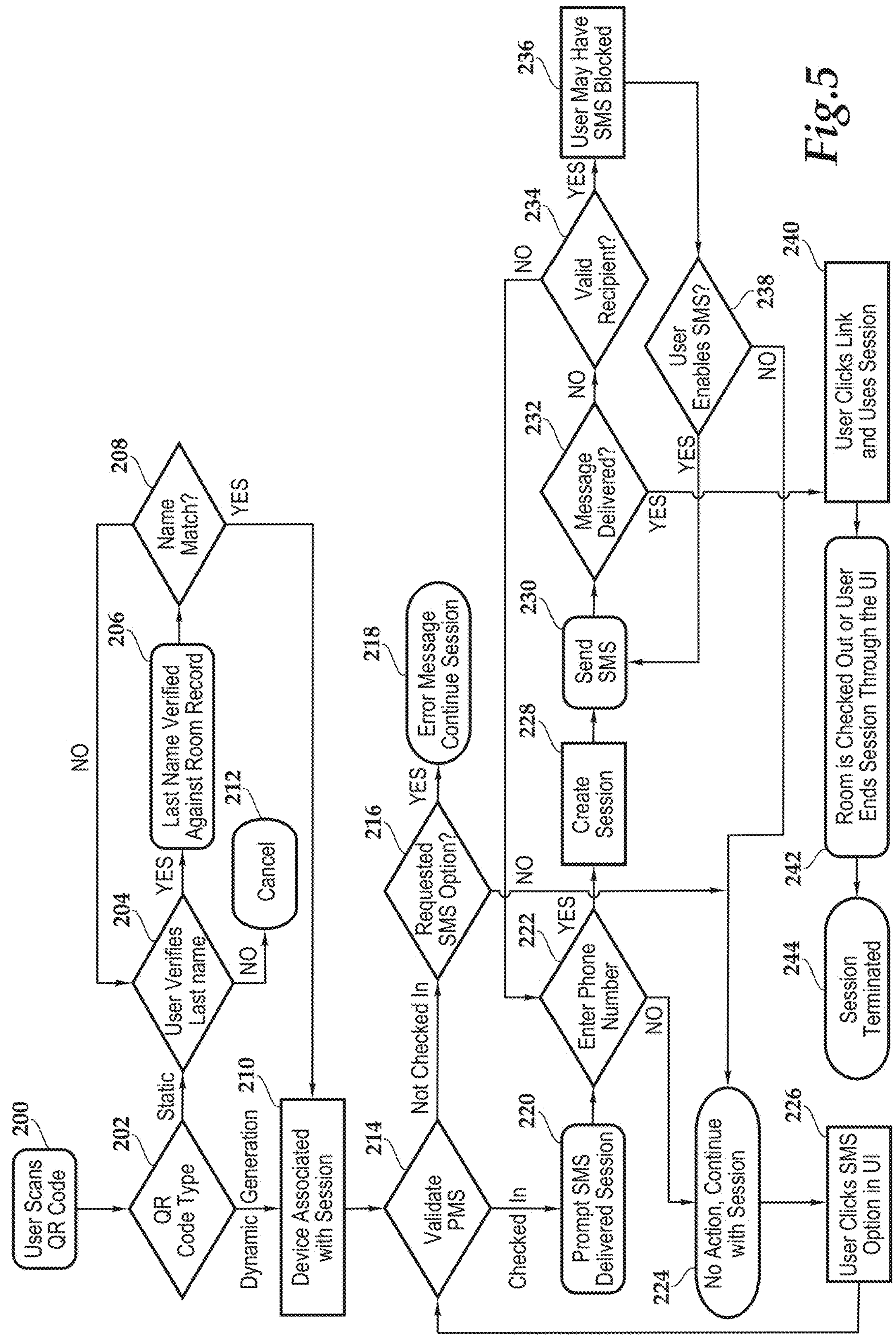
FIG. 5 is a flow chart depicting one embodiment of a method for providing remote control according to the teachings presented herein.

Referring now to FIG. 5, one embodiment of a method for providing a remote control feature for the operation, control, and status oversight of various amenities on properties shown as hospitality properties, such as lodging establishments, motels, or hotels, for example, is depicted. In the illustrated implementation, at block 200, via a smart device, a user scans a QR code on a display of a television, for example. At decision block 202, the QR code may be static or dynamic. If the QR code is static, then at decision block 204, the user is requested to verify his or her last name. At block 206, the last name is verified against room records and at decision block 208, if the name is a match then the methodology advances to block 210. On the other hand, if the name is not a match then the methodology returns to decision block 204. Returning to decision block 204, if the user fails to provide a last name then the methodology ends at block 212.

As mentioned at decision block 202, the QR code may be static or dynamic. In the instance the QR code is dynamic, as well as a static QR code completing a name match at block 208, the methodology advances to block 210 where the device is associated with a connection session. Then at decision block 214, the property management system is consulted for validation. If the user (e.g., guest) is not yet checked in, then the methodology advances to decision block 216, where if the guest requested a text option, then various error handling occurs at block 218 to determine the guest's status and preferences. On the other hand, if a text option was not requested, then the methodology advances to block 224.

Returning to decision block 214, if property management system is consulted and the guest is checked-in, then the methodology advances to block 220 where a prompt is provided to initiate the remote control authorization interface. At decision block 222, the guest is requested to enter a telephone number corresponding to a smart device that the guest desires to have remote control functionality of various amenities in the guest's room for the duration of the guest's stay or a portion thereof. If the guest does not enter a telephone number, then the methodology continues onto block 224, where no action is taken unless the guest activates the text option in the device interface at block 226.

Returning to decision block 222, if a telephone number is entered then the methodology advances through block 228 to block 230 where a text message is sent to the smart device that the guest desires to enable with remote control functionality of various amenities associated with the guest's stay. At decision block 232, if the text message fails to deliver then at decision block 234 the validity of the recipient is examined. If the recipient is not valid, then the methodology returns to decision block 222 where a telephone number is requested. If, however, the recipient is valid, then the methodology advances to block 236 where error handling examines if the intended recipient may have blocked the text message. At decision block 238, the guest's help is requested to enable the text communication to the recipient's telephone number. If this fails, then the methodology advances to block 224. On the other hand, if the guest assists with the text messaging being enabled, then the methodology returns to block 230 where the text message is sent again. Returning to decision block 232, if the text message was delivered, then the methodology continues to block 240 where the recipient of the message clicks on the link and initiates a remote control session, at the recipient's convenience. At block 242, once the guest is checked-out, the remote control functionality credentials are revoked and the methodology ends at block 244.

The order of execution or performance of the methods and data flows illustrated and described herein is not essential, unless otherwise specified. That is, elements of the methods and data flows may be performed in any order, unless otherwise specified, and that the methods may include more or less elements than those disclosed herein. For example, it is contemplated that executing or performing a particular element before, contemporaneously with, or after another element are all possible sequences of execution.

While this invention has been described with reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. A method for remote control, comprising: providing a first smart device, the first smart device including a housing securing a processor, non-transitory memory, and storage therein, the first smart device including a busing architecture communicatively interconnecting the processor, the non-transitory memory, and the storage, the first smart device including a wireless transceiver associated with the housing and coupled to the busing architecture, and a user interface associated with the housing and coupled to the busing architecture;

executing processor-executable instructions stored in the non-transitory memory, causing the first smart device to:

establish a first pairing between the first smart device and at least one proximate amenity, the first pairing enabling remote control of the at least one proximate amenity by the first smart device;

populate the user interface with a request for a telephone number;

receive the telephone number, the telephone number belonging to a second smart device; and send a link to the telephone number via a text messaging infrastructure, the link including an activation that establishes a second pairing between the second smart device and the at least one proximate amenity, the second pairing is authorized by way of the link, the second pairing enabling remote control of the at least one proximate amenity by the second smart device.

2. The method as recited in claim 1, further comprising providing that the first smart device comprises the second smart device.

3. The method as recited in claim 1, further comprising providing that the first smart device and the second smart device comprise independent devices.

4. The method as recited in claim 1, further comprising providing that the first smart device is selected from the group consisting of smart phones, smart tablets, smart watches, laptop computers, and smart wearables.

5. The method as recited in claim 1, further comprising providing that the at least one proximate amenity is selected from the group consisting of entertainment centers, televisions, set-top boxes, lights, speakers, window shades, and doors.

6. The method as recited in claim 1, further comprising providing that the at least one proximate amenity relates to an environment of a room.

7. The method as recited in claim 1, further comprising providing that the at least one proximate amenity relates to an environment of a room in a facility selected from the group consisting of hospitality environments, educational campuses, hospital campuses, office buildings, multi-unit dwellings, sports facilities, and shopping malls, whether a single story, multiple stories, or a combination thereof.

8. The method as recited in claim 1, further comprising providing that the at least one proximate amenity relates to an environment of a room in a hospitality environment.

9. The method as recited in claim 1, further comprising providing that the at least one proximate amenity further comprises a service.

10. The method as recited in claim 1, further comprising providing that the service is selected from the group consisting of repair services, delivery services, and housekeeping services.

11. The method as recited in claim 1, wherein establishing the first pairing between the first smart device and the at least one proximate amenity further comprises establishing the first pairing with the text messaging infrastructure.

12. The method as recited in claim 1, wherein establishing the first pairing between the first smart device and the at least one proximate amenity further comprises establishing the first pairing with non-text messaging infrastructure.

13. The method as recited in claim 1, wherein populating the user interface with the request for the telephone number further comprises populating the user interface with user instructions.

14. The method as recited in claim 1, wherein populating the user interface with the request for the telephone number further comprises populating the user interface via a contact directory on the first smart device.

15. The method as recited in claim 1, wherein receiving the telephone number further comprises receiving the telephone number via a virtual keypad on the user interface.

16. The method as recited in claim 1, wherein receiving the telephone number further comprises receiving the telephone number from a contact directory in the smart device.

17. The method as recited in claim 1, wherein sending the link to the telephone number via the text messaging infrastructure further comprises sending the link via a short message service (SMS)-enabled infrastructure.

18. The method as recited in claim 1, wherein the link including the activation establishes the second pairing between the second smart device and the at least one proximate amenity for a duration of a stay of a guest in a hospitality environment.

19. A method for remote control, comprising: providing a first smart device, the first smart device including a housing securing a processor, non-transitory memory, and storage therein, the first smart device including a busing architecture communicatively interconnecting the processor, the non-transitory memory, and the storage, the first smart device including a wireless transceiver associated with the housing and coupled to the busing architecture, and a user interface associated with the housing and coupled to the busing architecture;

executing processor-executable instructions stored in the non-transitory memory, causing the first smart device to:

establish a first pairing between the first smart device and at least one proximate amenity, the first pairing enabling remote control of the at least one proximate amenity by the first smart device;

populate the user interface with a request for a telephone number;

receive the telephone number, the telephone number belonging to a second smart device; and send a link to the telephone number via a short message service (SMS)-enabled infrastructure having an HTTP application program interface and a PSTN application program interface, the link including an activation that establishes a second pairing between the second smart device and the at least one proximate amenity, the second pairing is authorized by way of the link, the second pairing enabling remote control of the at least one proximate amenity by the second smart device.

20. A method for remote control, comprising: providing a first smart device, the first smart device including a housing securing a processor, non-transitory memory, and storage therein, the first smart device including a busing architecture communicatively interconnecting the processor, the non-transitory memory, and the storage, the first smart device including a wireless transceiver associated with the housing and coupled to the busing architecture, and a user interface associated with the housing and coupled to the busing architecture;

executing processor-executable instructions stored in the non-transitory memory, causing the first smart device to:

establish a first pairing between the first smart device and at least one proximate amenity, the first pairing enabling remote control of the at least one proximate amenity by the first smart device, the first smart device is associated with a guest staying in a room in a hospitality environment, the room having the at least one proximate amenity;

populate the user interface with a request for a telephone number;

receive the telephone number, the telephone number belonging to a second smart device; and send a link to the telephone number via a short message service (SMS)-enabled infrastructure having an HTTP application program interface and a PSTN application program interface, the link including an activation that establishes a second pairing between the second smart device and the at least one proximate amenity, the second pairing is authorized by way of the link, the second pairing enabling remote control of the at least one proximate amenity by the second smart device.

* * * * *